US012723921B2

(12) United States Patent
Revnew et al.

(10) Patent No.: US 12,723,921 B2
(45) Date of Patent: Sep. 1, 2026

(54) METHODS AND SOFTWARE APPLICATIONS FOR TINTING USING LOW RESOLUTION SPECTROPHOTOMETER

(71) Applicant: SWIMC LLC, Cleveland, OH (US)

(72) Inventors: Stephen M. Revnew, Chagrin Falls, OH (US); Anthony T. Congin, Willoughby, OH (US); James A. Leonard, Shaker Heights, OH (US); William M. Wharry, Cleveland Heights, OH (US); Timothy Beitl, Brunswick, OH (US); Michael C. Dowell, Aurora, OH (US); William E. Weber, III, North Ridgeville, OH (US)

(73) Assignee: SWIMC LLC, Cleveland, OH (US)

( * ) Notice: Subject to any disclaimer, the term of this patent is extended or adjusted under 35 U.S.C. 154(b) by 40 days.

(21) Appl. No.: 18/626,922

(22) Filed: Apr. 4, 2024

(65) Prior Publication Data

US 2024/0247981 A1 Jul. 25, 2024

Related U.S. Application Data

(63) Continuation-in-part of application No. 18/409,200, filed on Jan. 10, 2024, which is a continuation of (Continued)

(51) Int. Cl.
*G01J 3/46* (2006.01)
*G01J 3/02* (2006.01)

(Continued)

(52) U.S. Cl.
CPC ............ *G01J 3/463* (2013.01); *G01J 3/0272* (2013.01); *G01J 3/501* (2013.01); *B01F 33/84* (2022.01);

(Continued)

(58) Field of Classification Search
CPC ...... G01J 3/463; G01J 3/501; G01J 2003/467; G01J 3/46; G01J 2003/466
See application file for complete search history.

(56) References Cited

U.S. PATENT DOCUMENTS 3,601,589 A 8/1971 Mccarty
7,034,960 B2 4/2006 Stone et al.

(Continued)

FOREIGN PATENT DOCUMENTS

CL 2012002340 A1 4/2013
DE 102015220110 A1 5/2016

(Continued)

OTHER PUBLICATIONS

Tom Builds Stuff, "How To Match Paint Colors Accurately", https://www.youtube.com/watch?v=4W-RDBgWoeQ , Jul. 5, 2019 (Year: 2019).*

(Continued)

*Primary Examiner* — Maurice C Smith

(57) ABSTRACT

Methods and software applications for transmitting high-resolution spectral curve data to a tinter for generating a tint formula usable to custom-tint a base paint or coating to match the color of a sensed surface. The high-resolution spectral curve data is derived from low-resolution or wide-band spectral data obtained via a low resolution or wideband spectrophotometer. Additional user information, order information, or location information may be transmitted to the tinter.

15 Claims, 9 Drawing Sheets

Related U.S. Application Data application No. 18/052,401, filed on Nov. 3, 2022, now Pat. No. 11,906,359.

(60) Provisional application No. 63/294,594, filed on Dec. 29, 2021, provisional application No. 63/263,839, filed on Nov. 10, 2021.

(51) Int. Cl.

| | |
|---|---|
| ***G01J 3/50*** | (2006.01) |
| *B01F 33/84* | (2022.01) |
| *B01F 101/20* | (2022.01) |

(52) U.S. Cl.

CPC ......... *B01F 33/844* (2022.01); *B01F 2101/20* (2022.01); *G01J 2003/466* (2013.01); *G01J 2003/467* (2013.01)

(56) References Cited

U.S. PATENT DOCUMENTS

| | | | | |
|---|---|---|---|---|
| 7,116,420 | B2 | 10/2006 | Skierski et al. | |
| 7,466,415 | B2 | 12/2008 | Gibson et al. | |
| 7,536,231 | B2 | 5/2009 | McClanahan et al. | |
| 7,860,856 | B2 | 12/2010 | Lewis | |
| 8,929,646 | B2 | 1/2015 | Rodrigues et al. | |
| 9,346,028 | B2 | 5/2016 | Korenkiewicz et al. | |
| 9,674,323 | B1 | 6/2017 | Yu et al. | |
| 9,996,765 | B2 | 6/2018 | Yajko | |
| 10,038,884 | B2 | 7/2018 | Holub | |
| 10,057,549 | B2 | 8/2018 | Yu et al. | |
| 10,156,477 | B2 | 12/2018 | Yu et al. | |
| 10,746,599 | B2 | 8/2020 | Yu | |
| 10,970,879 | B2 | 4/2021 | Norris et al. | |
| 11,175,184 | B2 | 11/2021 | Super et al. | |
| 2004/0131347 | A1 | 7/2004 | Lowrey | |
| 2006/0126117 | A1 | 6/2006 | Stone et al. | |
| 2007/0032965 | A1* | 2/2007 | McClanahan | G01J 3/463 702/32 |
| 2007/0059844 | A1 | 3/2007 | Harper | |
| 2008/0026337 | A1 | 1/2008 | Jung et al. | |
| 2014/0025534 | A1 | 1/2014 | Pesicek | |
| 2015/0262383 | A1 | 9/2015 | Yajko | |
| 2018/0296995 | A1 | 10/2018 | Kinnen et al. | |
| 2019/0122216 | A1* | 4/2019 | Jain | G06Q 20/24 |
| 2020/0074686 | A1 | 3/2020 | Peden et al. | |
| 2023/0141740 | A1 | 5/2023 | Revnew et al. | |

FOREIGN PATENT DOCUMENTS

| | | | | |
|---|---|---|---|---|
| EP | 2393728 | B1 | 9/2014 | |
| EP | 2393884 | B1 | 4/2018 | |
| KR | 20170006073 | A | 1/2017 | |
| WO | 02082026 | A1 | 10/2002 | |
| WO | 201471302 | A1 | 5/2014 | |
| WO | WO-2022251819 | A1 * | 12/2022 | G01J 3/50 |

OTHER PUBLICATIONS

Visa Communication, "How Mobile Point of Sale Works", 2014 https://www.youtube.com/watch?v=9ZNNz-GabWo (Year: 2014).*

Extended European Search Report for related European Patent Application No. EP22893763 dated Feb. 14, 2025.

Quality magazine, "Connecting the Dots of Color Measurements," https://www.qualitymag.com/articles/87735-quality-101-connecting-the-dots-of-color-measurement,Jun. 2011. (Year: 2011).

Variable, "SPECTRO 1," https://www.variableinc.com/spectro-1.html Apr. 27, 2021 (Year: 2021).

Measure Color, "Spectra 1 Series: How to use SpotColor Tool", https://www.youtube.com/watch?v=Dt9nrDwgg50&list=PLAbTa8RYEtJ8xRybvcCqs2MIPcOLL8hkd&index=6, Jul. 9, 2020 (Year: 2020).

Color Sentinel Systems, "The only self-calibrating in line sprctrophotometer," https://colorsentinelsystems.com/spectrophotometers/, Oct. 5, 2023.

International Search Report for related PCT Application No. PCT/US2025/020640 dated May 22, 2025.

N. Sandor, "Spectral Interpolation Errors," COLOR Research and Application, Mar. 3, 2005, pp. 348-353, vol. 30, No. 5, Colour and Multimedia Laboratory, University of Veszprem, Veszprem Hungary.

* cited by examiner

Paired t-test p value = 0.38

Test

| | |
|---|---|
| Null hypothesis | $H_0$: $\sigma_1 / \sigma_2 = 1$ |
| Alternative hypothesis | $H_1$: $\sigma_1 / \sigma_2 \neq 1$ |
| Significance level | $\alpha = 0.05$ |

| Method | Test | | | |
|---|---|---|---|---|
| Statistic | DF1 | DF2 | P-Value | |
| Bonett | 1.67 | 1 | | 0.196 |
| Levene | 0.93 | 1 | 28 | 0.344 |

Analysis of Variance

| Source | DF | Adj SS | Adj MS | F-Value | P-Value |
|---|---|---|---|---|---|
| Regression | 3 | 44.3929 | 14.7976 | 112.52 | 0.000 |
| XA1046 | 1 | 23.5512 | 23.5512 | 179.08 | 0.000 |
| spectro_1 | 1 | 0.0875 | 0.0875 | 0.66 | 0.422 |
| XA1046*spectro_1 | 1 | 0.0436 | 0.0436 | 0.33 | 0.570 |
| Error | 26 | 3.4194 | 0.1315 | | |
| Lack-of-Fit | 22 | 3.2833 | 0.1492 | 4.39 | 0.080 |
| Pure Error | 4 | 0.1361 | 0.0340 | | |
| Total | 29 | 47.8122 | | | |

FIG. 8B

METHODS AND SOFTWARE APPLICATIONS FOR TINTING USING LOW RESOLUTION SPECTROPHOTOMETER

REFERENCE TO OTHER APPLICATIONS

This application is a continuation-in-part of U.S. patent application Ser. No. 18/409,200 filed Jan. 10, 2024, which is a continuation of U.S. patent application Ser. No. 18/052,041, filed Nov. 3, 2022 (now U.S. Pat. No. 11,906,359), which claims priority to U.S. Provisional Patent Application No. 63/263,839 filed on Nov. 10, 2021, and U.S. Provisional Patent Application No. 63/294,594, filed on Dec. 29, 2021. Each of the foregoing applications are incorporated by reference in their entirety.

TECHNICAL FIELD

The present invention relates to systems, methods, and software applications for generating a custom-tinted coating that matches the color of a preexisting surface.

BACKGROUND

Coatings such as paints and stains are often used to protect and/or decorate surfaces. Coating products can be tinted by mixing combinations of pigments into an untinted base product, such as a base paint or stain. The color of the applied coating product can be influenced both by the specific combination of pigments and by characteristics of the base product itself. Tint formulas indicate the combination and relative amounts of pigments to be mixed into a base product into order to produce a specific applied color. Tint formulas can be used by an operator for manual combination of pigments with base products or provided to a tinter apparatus for computer assisted or automated mixing of the specified pigments with the base product.

Manufacturers of coating products can produce or maintain certain color palettes, or sets of discrete colors, that can be created by applying appropriately tinted coating products. For any given color in a palette, manufacturers may maintain tint formulas for each of a variety of base products, such that each base product can be tinted to produce the color when applied to a surface. In addition to palette-based formulas, custom tint formulas can be needed when a desired color is not within a standard palette, or a new base product is created.

It is often desirable to apply a coating that will match a preexisting coating on a surface. One method of producing such a matched coating is to compare the color of the preexisting coating to one or more colors in a palette. The tint formula can then be selected from a preexisting library of tint formulas for the palette color and the base product. Such palette matching can be performed manually, such as with a swatch book including sample chips of the palette colors. Alternatively, a reading of the color of the preexisting coating can be produced using color sensing or measuring devices such as colorimeters and/or spectrophotometers. The color data produced by a color sensing device can be compared to color data expected for the palette colors. The palette color that best matches the color of the preexisting coating can then be selected. Once a palette color and selected base product are known, a tint formula can be determined.

Palette matching is inherently limited because preexisting coatings may have colors that occur anywhere across the gradient of visible colors and may not be visual matches to any color already existing in a given palette. It is often necessary, therefore, to determine a custom tint formula in order to produce a matching coating. Historically, custom tint formulas were created manually by combining pigments and base product in small amounts, applying the tinted coating to a surface, and evaluating the degree of match. As with palette matching, color measurement technology can provide data to assist in the creation of custom tint formulas.

A spectrophotometer is a device capable of sensing the amount of light a colored surface reflects at various wavelengths. Generally, spectrophotometers can measure the reflectance (in percent) at intervals across the visible spectrum. For example, a reflectance can be measured in 10 nm intervals from a wavelength of about 400 nm to about 700 nm. These 31 measurements can be plotted on a spectral curve, often described as a “31-point” curve. Other spectrophotometers may measure color at 20 nm intervals over the same wavelength band, yielding a 16-point curve. Numerous methods are known for determining tint formulas based on spectral data. Such methods may include those using combinatorial techniques to apply the Kubelka-Munk model to the properties of coating products and pigments.

In order to support such detailed measurements, spectrophotometers are generally expensive and difficult to use. Although some spectrophotometers may be portable, bringing a costly and relatively bulky spectrophotometer on a project site is undesirable, particularly for small projects where project cost does not allow transporting an expensive spectrophotometer on-site. Consequently, a user wishing to obtain color curve data for a surface must often bring a physical sample of the colored surface to a central location (such as a laboratory, or kiosk in a retail environment). This also is often undesirable, because where the surface is fixed (such as on a wall), a portion of the surface must be removed for transport. Even where a sample can be read non-destructively, the user must still bring the physical surface to a remote location.

In contrast to spectrophotometers, colorimeters are more limited color measuring devices. Colorimeters are desirable because they generally require fewer components and less power to operate and can be less expensive. In contrast to more complex spectrophotometers, colorimeters measure color through tristimulus filters and report tristimulus data. Reported data from a colorimeter is thus relatively rudimentary as compared to a spectrophotometer, and is usually reported data in a three-dimensional color space like CIE xyY, CIE L*a*b*, or other three-dimensional spaces.

Recently, more advanced portable colorimeters have had capability to provide more than tristimulus data. These advanced colorimeters (called “low-resolution spectrophotometers”) are relatively inexpensive, and may detect reflectance at a limited number of wavelengths, for example 8 or 10 points or wavelength bands of equal or unequal width, the bands overlapping or non-overlapping, and report this more advanced data.

The tristimulus color data provided by colorimeters can be used to perform palette matching, but are not suitable for generating custom tint formulas without metamerism. This is in part because tristimulus values cannot account for metamerism—a phenomenon wherein two colors can look identical under one light source but different under another. Colorimeters can generally take measurements under only Standard Illuminant C and Standard Illuminant D65, each of which has a spectral power distribution roughly approximating natural daylight. Spectral data, as can be produced by spectrophotometers using a wide range of illuminants, can determine metamerism and differentiate between colors that may appear identical under certain lighting conditions. Nonetheless, it may be possible to generate a custom tint formula using tristimulus values from a colorimeter, but the user must accept metamerism in the color match.

A need exists, however, for systems and methods for custom tinted coating products such that the color of the applied coating product matches the color of a preexisting coating based on data produced on-site at a customer's location from an existing surface.

SUMMARY

Presently disclosed is a system for producing a custom tinted coating formulation comprising a color sensing device that includes a low resolution spectrophotometer to sense color of a coated surface and generate low-resolution spectral data, a color data translation engine, a tint formulation engine, and a tinter that includes an array of colorants to tint a base coating composition by adding one or more colorants in amounts dependent on color measurements from the color sensing device.

In some approaches, the system may be combined with one or more optional features. In some approaches, the color sensing device is controlled by a mobile software application, or is a portable spectrophotometer. In some approaches, the color sensing device is capable of providing color measurements directly or indirectly to a color data translation engine via a mobile software application. In some approaches, the color data translation engine includes a database of device attributes, which is used to generate high resolution spectral data. In some approaches, the color data translation engine provides high-resolution spectral data such as a 31-point curve or a 16-point curve, ranging in the visible spectrum, from about 400 nm or about 450 nm to about 650 nm or 700 nm.

Also disclosed is a method for producing a tinted paint coating based on low-resolution spectral data, the method comprising adding one or more colorants to a base coating composition to generate a tinted coating composition, wherein an amount of each colorant is based on a high-resolution spectral curve derived from low-resolution spectral data of a sensed surface, wherein the amounts of one or more colorants added to the base coating composition is not pre-determined.

Also disclosed is a software application including computer-implemented code to provide data to a tinter for custom-tinting paint to match the color of a sensed surface, the code directing transmission of high-resolution spectral data, optionally user information, optionally order information, and optionally location information for a sensed surface, to a tinter for tinting a base paint or coating according to a custom-tint formula; wherein the high-resolution spectral curve data is derived from wideband spectral data of the sensed surface; and wherein the custom-tint formula includes amounts of one or more colorants from an array of colorants to be added to a base coating composition to generate a custom-tinted coating composition; and wherein the amounts of one or more colorants is not pre-determined. In some aspects, transmission of the high-resolution spectral data uses a barcode such as a QR code. In some aspects, the code directs transmission of location information of the sensed surface and optionally, display of location information of the sensed surface such as GPS location. In some aspects, the code further directs transmission of user information and, optionally, display of user information or order information on a mobile device such as the user's name, address, account number of combinations thereof. In some aspects, the code further directs transmission of order information such as a requested base coating composition, sheen, or volumes.

Additional optional aspects that may be combined independently or in combination with the foregoing aspects are disclosed herein. The above summary is not intended to describe each illustrated embodiment, feature, or every implementation of the subject matter disclosed herein. The figures and the detailed description that follow more particularly exemplify various embodiments and features of the present disclosure.

BRIEF DESCRIPTION OF THE DRAWINGS

Subject matter hereof may be more completely understood in consideration of the following detailed description of various embodiments in connection with the accompanying figures.

FIGS. 8A and 8B are charts depicting the results of testing of embodiments.

Figure 1:
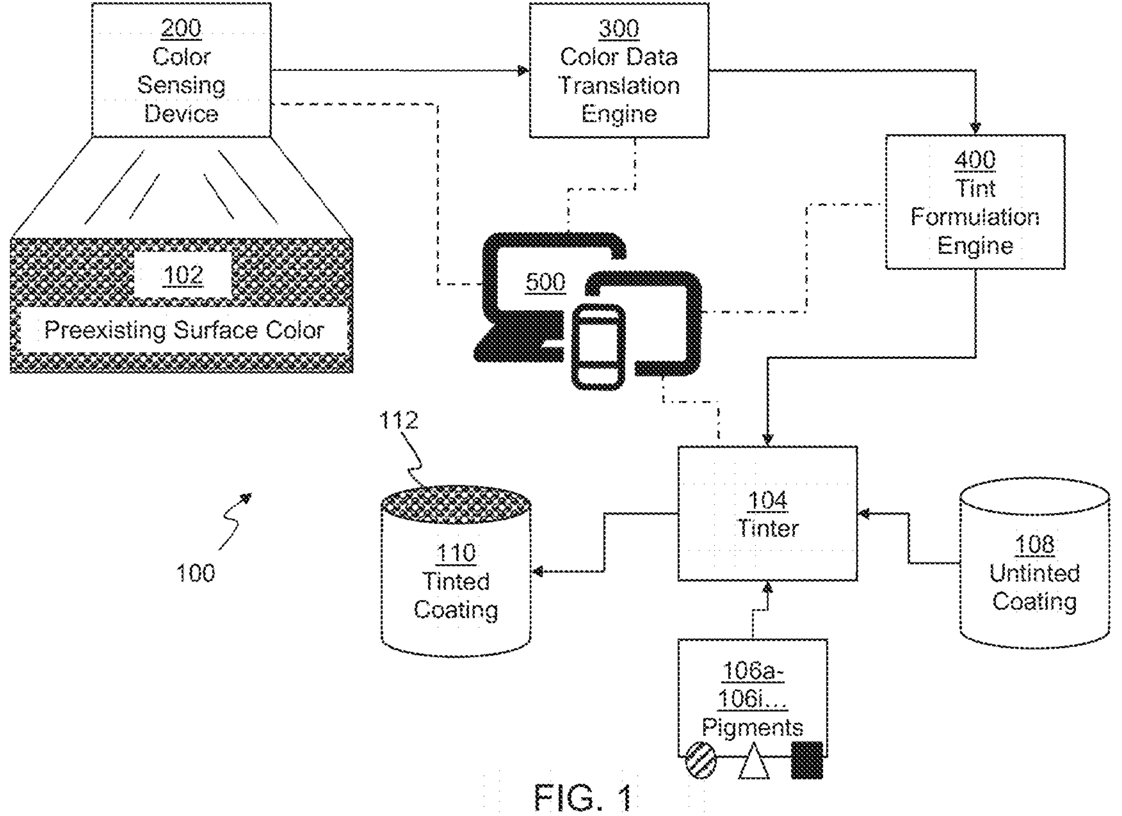
FIG. 1 is a schematic diagram depicting components of a color reproduction system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims. For instance, when a component is identified as having parts a through i (e.g., 106*a*-106*i*), it will be understood that any number of parts may be used in the component, and that the number is not limited by numbers equating to i.

DETAILED DESCRIPTION

FIG. 1 is a schematic diagram depicting components of a color reproduction system 100. System 100 can comprise or interact with color sensing device 200, color data translation engine 300, tint formulation engine 400 and controller 500. System 100 can detect a preexisting surface color 102, control a tinter 104 to combine one or more pigments 106*a*-106*i* with an untinted coating composition 108 to produce a tinted coating composition 110 having an applied color that matches preexisting surface color 102.

Tinter 104 can comprise a mixing system for paints, stains, or other coating products that can combine a plurality of different pigments 106*a*-106*i* with an untinted coating 108 to create a tinted coating 110 that when applied to a surface can have an applied color 112. Pigments 106*a*-106*i* can be any colorant ingredients such as dry or liquid pigments, paints, inks, dyes, stains, other substances, or combinations thereof. Untinted coating composition 108 can similarly be any substance capable of mixing with pigments 106*a*-106*i* to produce a tinted coating 110. Untinted coating composition 108 can, for example, be a base paint, stain, dye, or other substance. Untinted coating composition 108 can have one or more attributes such as opacity, sheen (matte, gloss, satin, etc.), base pigment (white, eggshell, red etc.), and the like. Those of ordinary skill in the art will appreciate that the creation of tinted coating 110 can be influenced by a number of attributes of pigments 106*a*-106*i* and untinted coating compositions 108, such that not all pigments can be successfully mixed with all coatings. Therefore, the production of a tinted coating with a specific applied color 112 requires the mixing of a variety of pigments 106*a*-106*i* with the appropriate proportions, as can be defined in a tint formula 402 (as discussed in more detail with respect to FIG. 6 below).

Tinter 104 can comprise one or more input interfaces for receiving tint formula 402 and/or additional information or instructions for production of tinted coating composition 110. Tinter 104 can further comprise one or more output interfaces for display or provision of information related to production of tinted coating 110, including status information, or instructions for loading, mixing, measuring, or combining of untinted coating composition 108 with pigments 106. The input and output interfaces of tinter 104 can be provided via a terminal, through network connections to controller 500, or other communicative means. Tinter 104 can comprise software or firmware configured to control the combination of pigments 106*a*-106*i* to untinted coating composition 108 for creation of tinted coating 110. This mixing process can optionally be integrated within tinter 104 or can be performed manually based on instructions provided via tinter 104. Tinter 104 can therefore comprise any of a number of known devices for the physical combination of pigments with coating products in the appropriate proportions.

In embodiments, tinter 104 can be located in a physical brick-and-mortar store, a factory, or any other facility where coating products can be mixed. A point-of-sale ("POS") terminal can be located in the same facility as tinter 104. The POS terminal can include a scanner configured to interrogate a computer-readable code (e.g., barcode, RFID tag, etc.) to identify the sales price of the coating product, and possibly other data concerning the coating product itself. For instance, interrogation of the barcode can allow the POS terminal to identify the formula including the plurality of individual colors and their respective quantities combined to achieve the desired color. According to alternate embodiments, the formula can be associated with a human-readable code (e.g., a serial number) that, when entered into the POS terminal, allows the POS terminal to identify the formula for the desired applied color.

Figure 2:
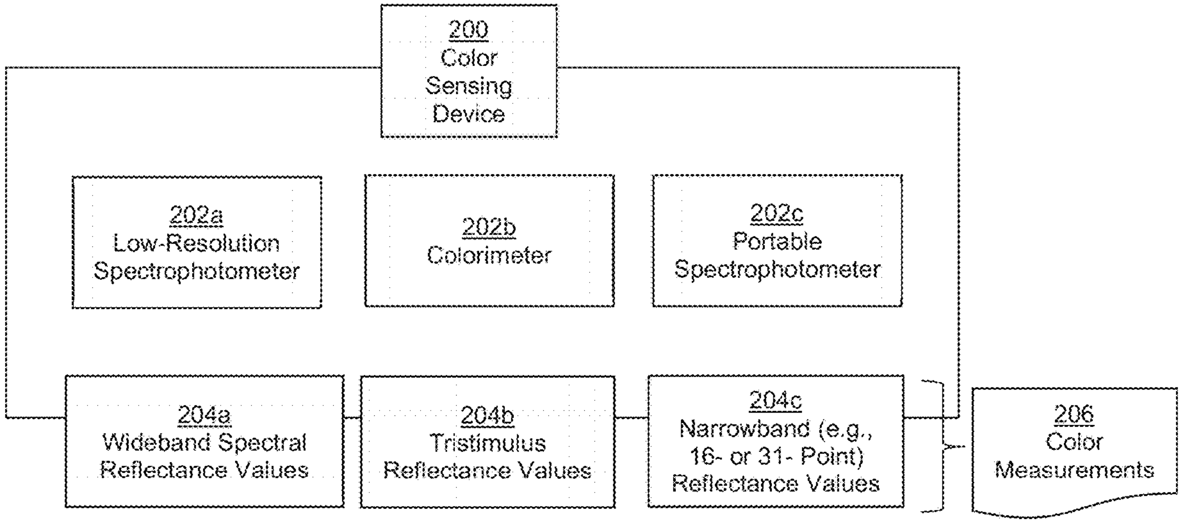
FIG. 2 is a schematic diagram depicting the embodiments of color sensing device 200 and color measurements 202.

FIG. 2 is a schematic diagram depicting the embodiments of color sensing device 200 and color measurements 202. Color sensing device 200 can be any portable device including sensing hardware and software for detecting values related to a preexisting surface color 102. Preexisting surface color 102 can be a naturally occurring color or a coating previously applied to one or more areas on a surface. For example, the surface can be a wall, a textile, a vehicle panel, a swatch, or the like. Furthermore, the surface can be a sample prepared by the application of a substance (such as a liquid or gel) to a collection substrate such as a slide or paint chip. Regardless, color sensing device 200 is configured to read, or detect, certain attributes of preexisting surface color 102 and provide an output of color measurements 202. Color sensing device 200 can comprise one or more interfaces for receiving control instructions and/or attributes of preexisting surface color 102, and for outputting color measurements 202. Color sensing device 200 may be controlled by a software application that is internal to the color sensing device, or external to the color sensing device.

A software application controlling the color sensing device may be, for example, a mobile software application. The mobile software application may display a depiction of the sensed color on a screen of the mobile device. The mobile software application may record and/or display other information, including, for instance, location information such as an inputted or GPS location, or a room, or an address for the sensed color; and user information such as an identification of the user, an account number, the user's address, or other user notes. The mobile software application by record and/or display order information including one or more requested base coating compositions, volumes (e.g., gallons or liters of coating composition), sheens, and base colors. The interfaces can comprise an integrated user interface and/or color sensing device 200 can be communicably couplable to controller 500 or other components of system 100.

Color sensing device 200 can comprise low-resolution spectrophotometer 202*a* configured to provide values representing the reflectance of preexisting surface color 102 at one or more wavelengths across the visible spectrum as wideband spectral reflectance values 204*a*; or a colorimeter 202*b* providing trisimulus values 204*b*; or portable spectrophotometer 204*c*. In contrast to conventional spectrophotometers, low-resolution spectrophotometer 202 can measure reflectance at a relatively small number of wavelength bands across the visible spectrum (for example, three, eight, or ten points, as opposed to thirty or more). Low-resolution spectrophotometer 202*a* can therefore comprise a smaller and more portable device than standard spectrophotometers known in the art. Low-resolution spectrophotometer 202*a* can be a commercially available device such as a SPECTRO or SPECTRO PRO (as produced by Variable, Inc.), the Color Reader PRO from DataColor Corp., or the like.

Those of ordinary skill in the art will appreciate that the particular sensing hardware and software configuration of color sensing devices 200 known in the art may vary the form of color measurements 206 provided as output. In embodiments, for example, low-resolution spectrophotometer 202*a* may make available color measurements 206 that resemble wideband spectral reflectance values 204*a*. Color measurements 206 as described herein, therefore, are understood to encompass wideband spectral reflectance values 204*a*, tristimulus colorimeter data 204*b*, or narrow-band spectra reflectance values 204*c*, or combinations thereof.

Figure 3:
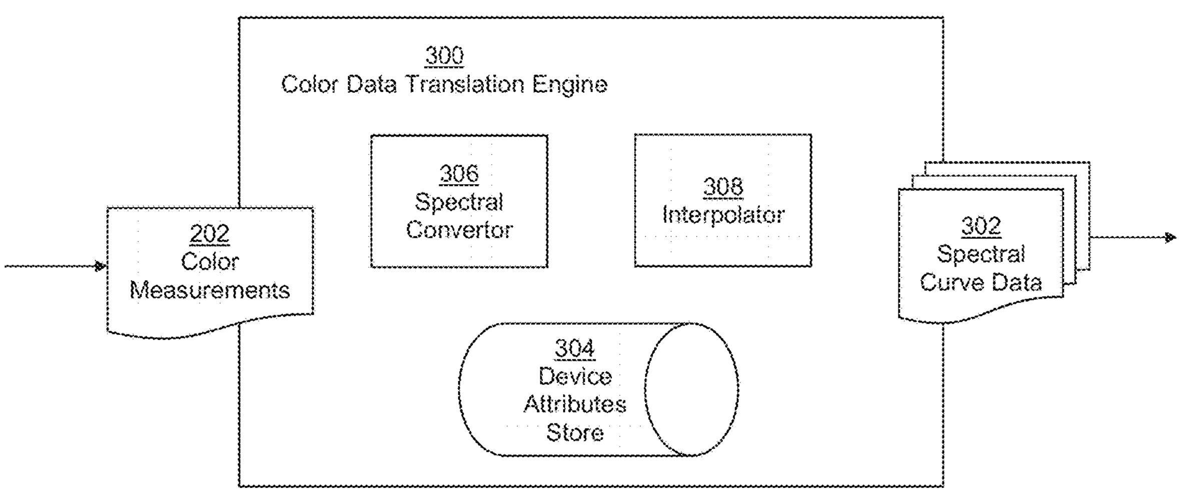
FIG. 3 is a schematic diagram depicting components of a color data translation engine 300, according to an embodiment.

FIG. 3 is a schematic diagram depicting components of a color data translation engine 300, according to an embodiment. Color data translation engine 300 comprises interfaces for receiving color measurements 202 and outputting spectral curve data 302. The communication of color measurements 202 from color sensing device 200 of FIG. 2. to color data translation engine 300 can occur directly or indirectly. In some approaches, a mobile software application may control or interface color sensing device 200 to color data translation engine 300. The interfaces can comprise an integrated user interface and/or color data translation engine 300 can be communicably coupleable to controller 500 or other components of system 100. Such communication may occur via wired, wireless, Bluetooth, or other electronic protocols.

Device attributes store 304 can be database, data store, or other non-volatile memory comprising attributes of color sensing device 200 can then be used by components of color data translation engine 300 to perform calculations related to conversion to wideband spectral curve values and interpolation to full spectral curve data 302. For example, device attributes store 304 can comprise data records indicating the color space within which low-resolution spectrophotometer reflectance values 204*a* as provided by a low-resolution spectrophotometer 200*a* are defined, and/or standard illuminants used for measurements by a particular color sensing device 200. Device attributes 304 can be used for calculations to approximate a spectral distribution from color measurements 206.

Example data records, as may be stored in an embodiment of device attributes store 304 are provided in Table 1 below:

TABLE 1

| Device Identifier | Color Space | Number of Data Points | Illuminant | Coefficients/Band Locations |
|---|---|---|---|---|
| SpectrolPro | Spectral | 8 | Any standard illuminant | Band 1: 470-575, Band 2: 575-583, Band 3: 580-584, Band 4: 583-590 . . . |
| RM200QC | CIELAB | 5 | D65 | L = 0.3, a = 0.7, b = 0.2 |
| CI52x | Spectral | 31 | Any standard illuminant | 400-700 nm, 10 nm intervals |

In embodiments, one or more device attributes can be received with or as part of color measurements 202, for optional storage in device attributes store 304.

Spectral converter 306 can receive wideband spectral reflectance values 204 *a* with or without tristimulus values 204*b* and perform lookups and/or calculations to convert from a three dimensional color space to an approximated wideband spectral curve based on the illuminant(s) used. Those of ordinary skill in the art will appreciate that a color defined in a tristimulus color space may correspond to multiple spectral curve profiles due to metamerism. To decrease the degree of metamerism, spectral converter 306 can attempt to select the most appropriate approximation based on, for example, illuminant attributes of color sensing device 200 in combination with other wideband spectral data 204*a* or portable spectrophotometer data 204*c*.

Figure 4:
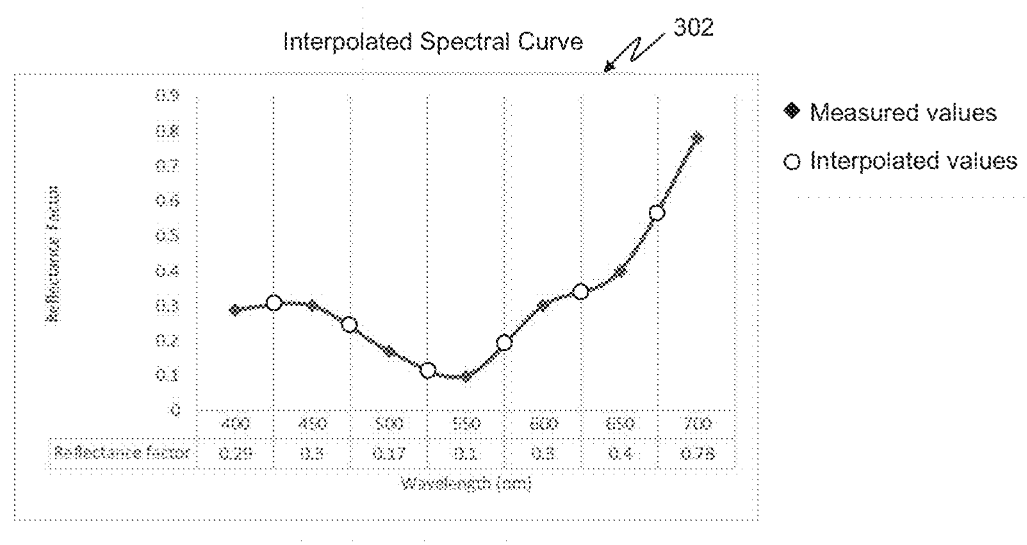
FIG. 4 is a graph depicting an example interpolated spectral curve, as may be produced according to an embodiment.

Interpolator 308 can receive wideband spectral curve values, either as directly received in color measurements 206, or as converted by spectral converter 306, and produce spectral curve data 302. For example, as depicted in FIG. 4, interpolator 308 can infer reflectance factors at wavelengths between those directly measured (or translated) to increase the density of spectral data available to tint formulation engine 400. Interpolator 308 can use one or more interpolation methods known in the art include linear, cubic, nearest neighbor, or the like. Furthermore, interpolator 308 can use interpolation techniques known to be valuable for spectral data, such as Sprague interpolation, and may also employ machine-learning techniques. In one embodiment, interpolator 308 can receive 8-10 wideband spectral reflectance values and produce spectral curve data 302 with 31 spectral reflectance values.

In some instances, the sensed surface may have a texture, such as a stipple, brush, or other pattern. Multiple color measurements 202 across adjacent areas of a sensed surface may be obtained and averaged or interpolated to account for surface texture of the sensed surface.

A software application can use color measurements 206 or spectral curve data 302 and determine a closest match to a pre-existing library of palette colors for tinted paints and coatings, and display the closest match on a screen. The software application also may display the sensed color of the surface using color measurements 206 or spectral curve data. A user may then elect whether the closest match palette color is an acceptable match or whether custom-tinting is needed. In some instances, the software application may be a mobile software application, and may be the same or a different software application as the application controlling the spectral device.

Figure 5:
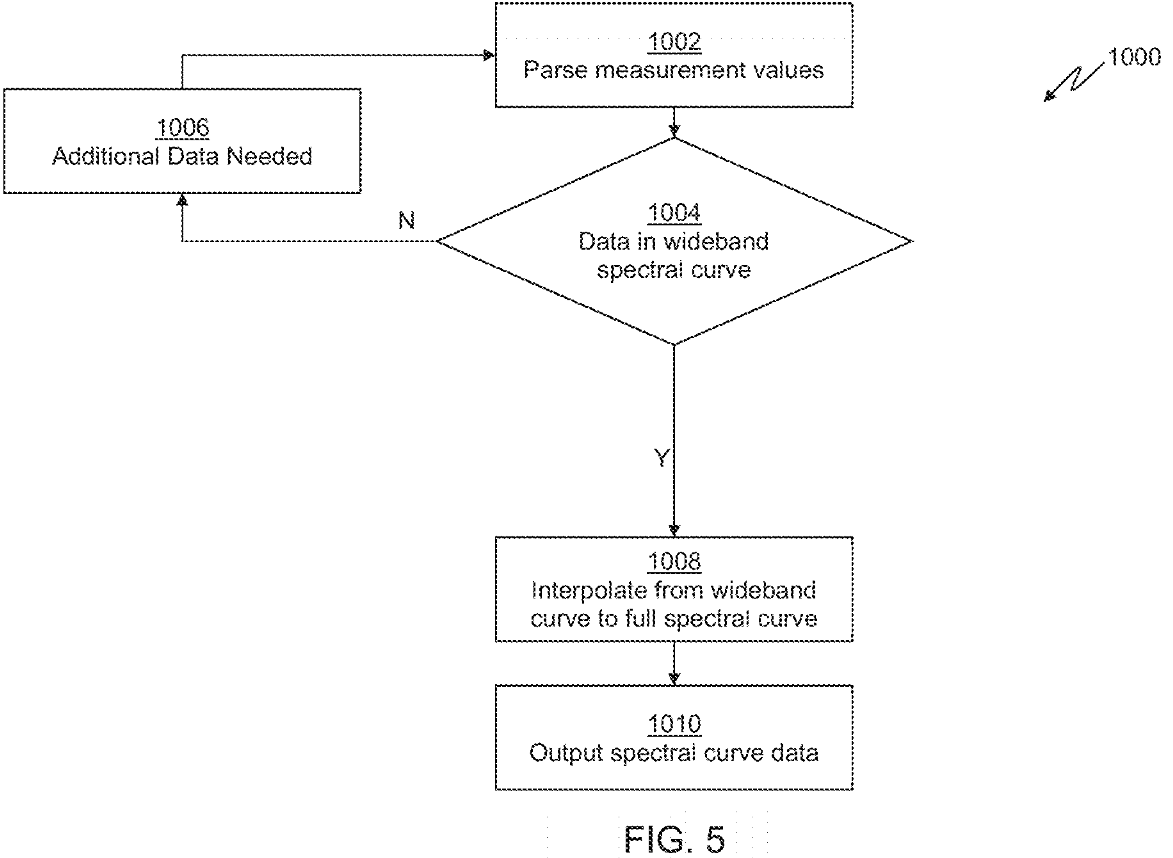
FIG. 5 is a flowchart depicting a method for generating spectral curve data, according to an embodiment.

FIG. 5 is a flowchart depicting a method 1000 for generating spectral curve data as may be performed by color data translation engine 300. At 1002, color measurement values can be received from color sensing device 200. The color measurement values can be directly received from color sensing device 200, or can be received through controller 500, or as input by a human or programmatic user. The color measurement values can be parsed into a format that is manipulable by color data translation engine 300.

At 1004, if the values are in a wideband spectral curve then processing can proceed directly to 1008. If the values are not wideband spectral curve, then the process may respond that additional data is needed at 1006 before returning to parse additional values or supplemental values at 1002. At 1008, wideband spectral curve data can be interpolated to increase the density of spectral curve data that is output at 1010.

Figure 6:
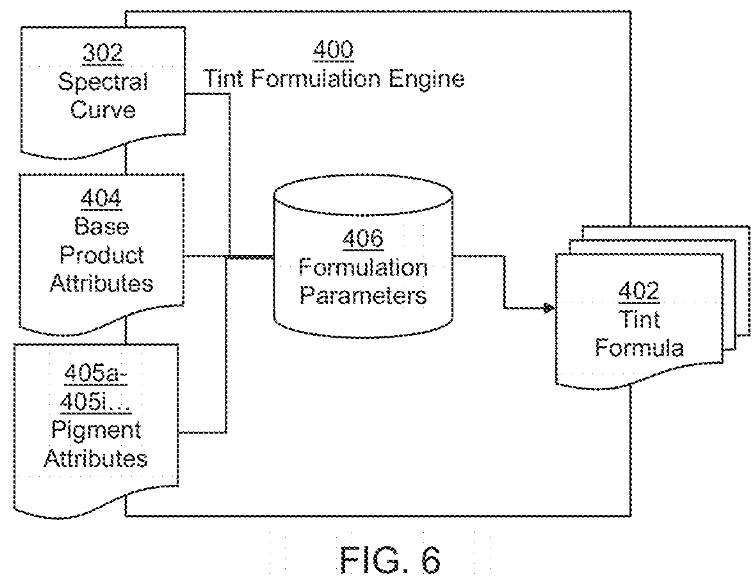
FIG. 6 is a schematic diagram depicting components of a tint formulation engine, according to embodiments.

FIG. 6 is a schematic diagram depicting component of tint formulation engine 400 according to an embodiment. Tint formulation engine 400 can receive spectral curve data 302 and produce tint formula 402. In embodiments, tint formulation engine 400 can further receive base product attributes 404 defining characteristics of untinted coating 108 that may affect the calculated tint formula. Tint formulation engine 400 can also receive base product attributes 405*a* through 405*i* for each pigment 106*a* through 106*i* to be used to produce tint formula 402. Formulation parameters 406 can be provided to tint formulation engine 400 in a non-volatile data store, and can further define parameters, information, lookup tables, and the like that are usable by tint formulation engine 400 to produce tint formula 402.

Tint formulation engine 400 can various use tint formulation techniques known in the art including combinatorial color matching to generate tint formula 402. For example, tint formulation engine can use techniques such as those described in U.S. Pat. No. 9,346,028 to Korenkiewicz et al., U.S. Pat. No. 9,996,765 to Yajko, U.S. Pat. No. 7,116,420 to Skierski et al., and/or U.S. Pat. No. 2020/0096390 to Supèr et. al. Tint formulation engine can further generate a closest match to an existing palette color which is then utilized for custom tint matching to a sensed color using the tint formulation engine.

Returning now to FIG. 1, tint formula 402 can be provided to tinter 104, for combination of pigments 106*a* through 106*i* and untinted coating 108 to produce custom tinted coating

110 having applied color 112 that matches preexisting surface color 102 under a range of lighting environments.

Figure 7:
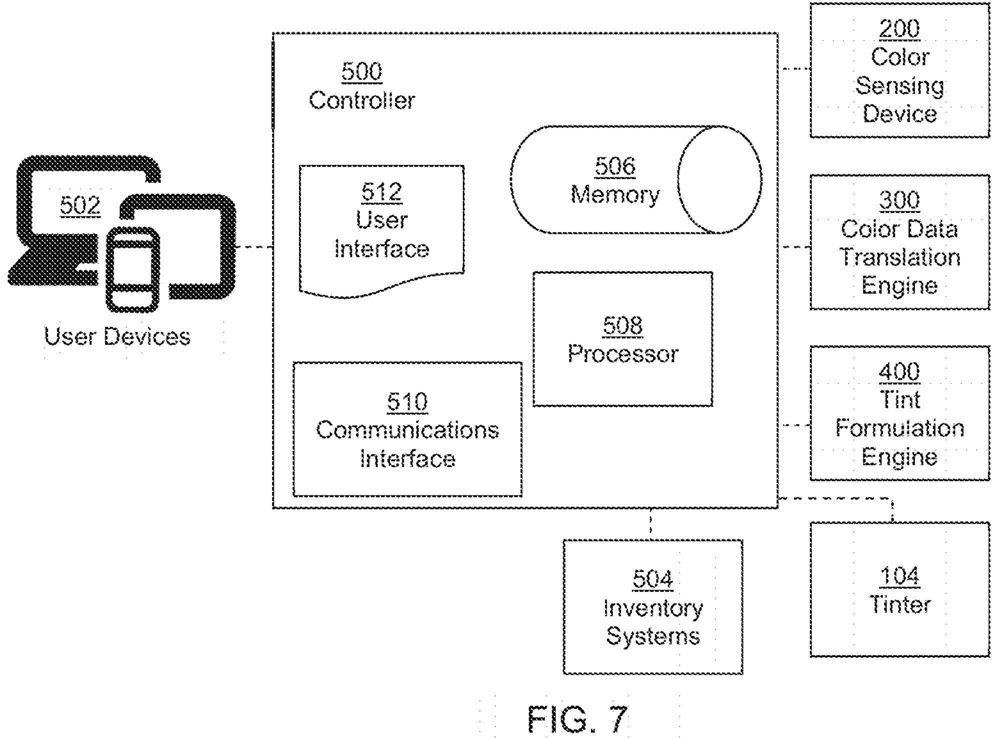
FIG. 7 is a schematic diagram depicting a controller according to an embodiment.

FIG. 7 is a schematic diagram depicting a controller 500, according to an embodiment. Each of color sensing device 200, color data translation engine 300, tint formulation engine 400, and tinter 104 can comprise hardware, software, firmware of combinations thereof for performing the functions depicted and described herein. Each component of system 100, therefore, can reside on or comprise one or more interconnected computing systems, each including a processor and memory and interfaces, such as network interfaces for communication between them. In embodiments, one or more components of system 100 can reside on or be communicatively coupled to controller 500, such that user devices 502, inventory systems 504, or other components of system 100 can communicate via controller 500.

Controller 500, as with other computing devices depicted and described herein can comprise a memory 506, which can include both transitory and non-transitory components, and processor 508. Memory 506 can comprise a non-transitory computer readable medium having instructions thereon which, when executed by processor 508 can facilitate the performance of methods and processes as depicted and described herein. Communications interface 510 can comprise one or more network connections enabling communicative coupling between the various components of system 100. Network connections can include network adaptors (e.g., a modem, a network card (wireless or wired), an infra-red communication device, fiber optic communication device, etc.) and facilitate the communication of data, information, and/or any content electronically between network-connected devices over the communication network. Network connections can also include the use of a barcode such as a 2D barcode, a 3D barcode, a matrix barcode, or a QR code, displayed on a mobile software application, to transmit information across connected parts of the system.

User interface 512 can receive user inputs and provide user outputs regarding configuration of system 100 operation of color sensing device 200, engines 300, 400, and/or tinter 104. User interface 512 can comprise a mobile application, web-based application, or any other executable application framework. User interface 512 can reside on, be presented on, or be accessed by any computing devices capable of communicating with the various components of system 100, receiving user input, and presenting output to the user such as user devices 502. In embodiments, user devices 502 can reside or be presented on a smartphone, a tablet computer, laptop computer, or desktop computer.

In one example embodiment, color sensing device 200 can comprise a SPECTRO 1 PRO, as produced by Variable, Inc. The SPECTRO 1 PRO is a lightweight and portable low-resolution spectrophotometer that is wirelessly coupleable to a computing device such as an IPHONE or IPAD, as produced by Apple Computer, Inc., via a BLUETOOTH connection. Application software executing on the computing device can receive color measurement data, which can be wideband spectral reflectance values 204*a*, and perform interpolation to produce spectral curve data 302 which can be saved in a memory of the computing device. Additional application software, such as controller 500, can execute on the computing device or on a separate computing device to access the spectral curve data 302, via an API (application programming interface), or by direct access of the memory on the computing device. The spectral curve data can be converted to a format comprehensible by a tint formulation engine such as the SHER-COLOR™ application, as produced by Sherwin-Williams Company. The SHER-COLOR™ application can receive spectral curve data and produce a tint formulation for one or more untinted coating products. The tint formulation can be communicated to a tinter in a retail location to initial production of a tinted coating that, when applied to a surface, will match the preexisting surface color. Alternatively, the tint formulation can be communicated to a factory, wherein larger amounts of base paint or coating may be custom-tinted to meet a customer's volume needs.

Figure 8A:
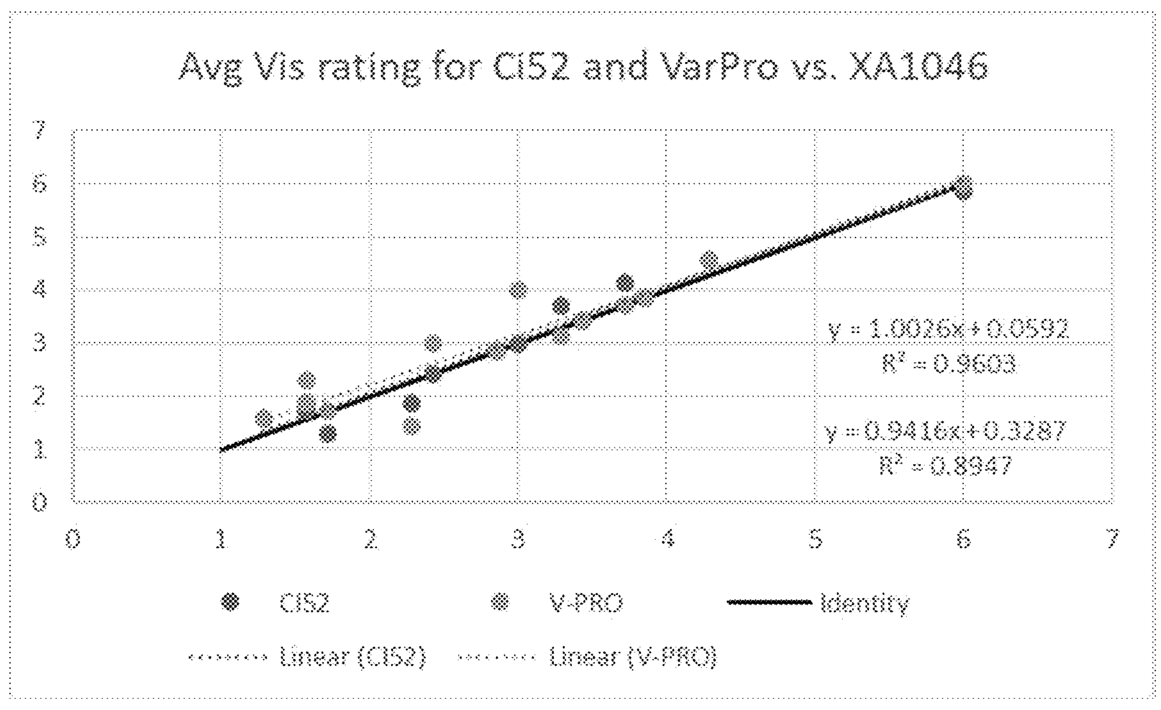

FIG. 8A is a chart depicting test results evaluating the performance of embodiments of system 100 in reproducing a preexisting surface color as compared to a conventional method. FIG. 8B is a chart depicting additional test data. In the conventional methodology, color measurements were taken by a powerful benchtop spectrophotometer, in this case a XA1046 (7000A) as produced by X-Rite, Incorporated. At test palette was used with 15 objects. The test palette included discrete colors that span the palette of the PRATT & LAMBERT® fan deck and British Ceramic Research Association (BCRA) tiles.

The test objects were read by three spectrophotometers: the XA1046, the SPECTRO 1 PRO, as produced by Variable, Inc., and the CI52X portable spectrophotometer as produced by X-Rite, Incorporated. Spectral curves from each device were extracted and converted and input to the SHER-COLOR™ application for generation of tint formulas. The formulas were mixed and applied to chips that were visually evaluated. The matches were rated on a scale from 1-6 where: 1=nearly perfect, 2=good, 3=fair but acceptable, 4=close but not acceptable, 5=bad, 6=terrible. Seven observers rated the chips and the results were averaged. An average rating of less than 3.5 was considered a pass.

The portable units each passed for 10 of the 15 colors, whereas the benchtop unit (XA1046) passed for 11 of the 15 colors. The average rating and the standard deviation in ratings of the SPECTRO 1 PRO were slightly higher than the CI52X but not to a statistically significant degree. Overall curves generated by the SPECTRO 1 PRO were found to not produce visibly worse formulas than the other color measuring devices tested.

The systems and methods of the present disclosure provide a number of improvements over conventional color reproduction systems. Color reproduction system 100 enables the reproduction of preexisting surface colors based on measurements received by portable color sensing devices, such as low-resolution spectrophotometers. As such, preexisting surface colors can be measured in place, for example at a work site where paint needs to be touched up without the need to remove and/or transport a sample of the surface color to a larger facility for analysis by a more sophisticated spectrophotometer. Thus, systems and methods of the present disclosure are able to provide tinted coatings that match the color of a preexisting surface, wherein the tint formula to produce the tinted coating is not predetermined.

System 100 further enables the color measurement to occur at a location that is remote from the location of the tint formulation process, or the coating mixing process itself. One or more components of system 100 can be "cloud" or network based, such that a user can measure color data in one location and direct the creation of tinted coatings by a tinter at a remote location. In embodiments, system 100 can interact with a point-of-sale fulfillment systems or factory-based computer systems such that the measurement data can be used to create a custom tinted coating that is delivered to the location where the measurement was taken without the user needing to physically deliver samples or measurements to a store or other location for procurement of tinted coatings.

In some embodiments, a mobile software application may be used to transmit wideband, low resolution, or high resolution spectral data from a user's location to a tinter. In this arrangement, the mobile software application user may use a low resolution spectrophotometer to sense the color of an existing surface at a location, such as a painting jobsite, that is remote from the tinter. Data from the mobile software application may be transmitted to a tinter by any suitable means, including hardwired network, wireless network, or Bluetooth. In some embodiments, data from the mobile software application may be transmitted by generation of a barcode such as a QR code which can be scanned to be inputted into a tinter. The barcode can be displayed on a mobile device to be scanned, or sent by instant message, emailed, etc.

In some embodiments, additional information such as location information, e.g., GPS, street address, or room, may be transmitted by the mobile software application. User information such as a description or identification of the sensed surface or a user's account number may be transmitted. One or more requested base coating compositions or sheens, or requested volumes, may also be transmitted. User notes of the sensed surface also may be transmitted.

If received by a tinter as low resolution or wideband spectral data, a color formulation engine may derive high resolution spectral data from the low resolution or wideband spectral data. A custom-tint formula determined by the tinter includes amounts of one or more colorants from an array of colorants to be added to a base coating composition to generate a custom-tinted coating composition. In addition, the closest existing color in a color pallete may be determined. The closest existing pallete color may be shown to the user or sent to the user's mobile device. The mobile software application may display the color of the sensed surface as sensed by a low-resolution spectrophotometer. In some embodiments, the mobile software application may display the closest existing pallete color on the user's screen. The display of the sensed color and the existing pallete color can be achieved, for instance, by the methods and software disclosed in U.S. Pat. No. 11,410,335 B2, titled "Digital System and Method for Paint Color Matching," the content of which is incorporated by reference herein. Thus, the mobile software application allows for a user to request that a custom-tinted base paint or coating, in a desired coating composition or sheen, be produced to match a color sensed by the application user at a location remote from the tinter.

In one embodiment, the system 100 and/or its components or subsystems can include computing devices, microprocessors, modules and other computer or computing devices, which can be any programmable device that accepts digital data as input, is configured to process the input according to instructions or algorithms and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The term "about" as used herein refers to ordinary variations in measurement of a quantity or performance or output of a device about a targeted quantity.

The term "paint" means a coating composition including pigment (or dye) and binder which when applied to form a thin (e.g., 100 μm) wet thickness coating film on a freshly-sanded smooth wood surface, will when dried hide both the wood grain and its texture and will present a new surface with its own appearance.

For purposes of interpreting the claims, it is expressly intended that the provisions of Section 112, sixth paragraph of 35 U.S.C. are not to be invoked unless the specific terms "means for" or "step for" are recited in a claim.

EMBODIMENTS

Embodiment 1: A system for producing a custom tint paint formulation comprising: a color sensing device including a low resolution spectrophotometer capable of sensing color of a sensed surface and generating low-resolution spectral data, a color data translation engine, a tint formulation engine, and a tinter that includes an array of colorants and is capable of tinting a base coating composition by adding one or more colorants in amounts dependent on color measurements from the color sensing device to match the color of the coated surface.

Embodiment 2: The system of any preceding embodiment, wherein the color sensing device is a portable spectrophotometer.

Embodiment 3: The system of any preceding embodiment, wherein the color sensing device is controlled by a mobile software application.

Embodiment 4: The system of any preceding embodiment, wherein the color sensing device is capable of providing low-resolution spectral data of a colored surface directly or indirectly to a color data translation engine via a mobile software application.

Embodiment 5: The system of any preceding embodiment, wherein the color data translation engine includes a database of device attributes used to generate high resolution spectral data.

Embodiment 6: The system of any preceding embodiment, wherein the color sensing device illuminates a colored surface using a light emitting diode.

Embodiment 7: The system of any of embodiments 1 to 4, wherein the color sensing device illuminates a colored surface using a D65 illuminant.

Embodiment 8: The system of any preceding embodiment, wherein the color sensing device produces low-resolution spectral data based on color measurements of a surface with a plurality of lighting sources.

Embodiment 9: The system of any preceding embodiment, wherein the color sensing device produces low-resolution spectral data based on color measurements of a surface with a plurality of lighting intensities.

Embodiment 10: The system of any preceding embodiment, wherein the color data translation engine provides high-resolution spectral curve data.

Embodiment 11: The system of embodiment 10, wherein the high-resolution spectral curve data is a 31-point curve ranging from at least about 400 nm to about 700 nm.

Embodiment 12: The system of embodiment 10, wherein the high-resolution spectral curve data is a 16-point curve ranging from at least about 400 nm to about 700 nm.

Embodiment 13: The system of embodiment 10, wherein the high resolution spectral curve data has a wavelength range of at least about 400 to about 600 nm.

Embodiment 14: The system of any preceding embodiment, wherein the tint formulation engine is capable of receiving base product attributes for each colorant in the array of colorants.

Embodiment 15: The system of any preceding embodiment, wherein the tint formulation engine has stored base product attributes for each colorant in the array of colorants.

Embodiment 16: The system of any preceding embodiment, wherein the tint formulation engine is capable of receiving base paint information.

Embodiment 17: The system of any preceding embodiment, wherein the tint formulation engine has stored base paint information.

Embodiment 18: The system of any preceding embodiment, wherein the tint formulation engine includes information about existing palette colors.

Embodiment 19: The system of any preceding embodiment, wherein the tint formulation engine generates a tint formula based at least on colorant base product attributes and base paint information and high-resolution spectral curve data.

Embodiment 20: The system of embodiment 19, wherein the tint formulation engine generates a tint formula based on a closest match to an existing palette color.

Embodiment 21: The system of any preceding embodiment, wherein the tinter is capable of receiving a tint formula from the tint formulation engine.

Embodiment 22: The system of any preceding embodiment, wherein the array of colorants includes at least white, red, green, blue, and yellow, and black.

Embodiment 23: A method for producing a tinted paint coating comprising: adding one or more colorants to a base coating composition to generate a tinted coating composition, wherein an amount of each colorant is based on a high-resolution spectral curve derived from low-resolution spectral data of a sensed surface, wherein the amounts of one or more colorants added to the base coating composition is not pre-determined.

Embodiment 24: The method of any preceding embodiment further comprising: deriving the high-resolution spectral curve from low-resolution spectral data by interpolating the low-resolution spectral data.

Embodiment 25: The method of any preceding embodiment, wherein the high-resolution spectral curve has 31 points.

Embodiment 26: The method or system of any preceding embodiment, wherein the low-resolution spectral data having no more than 16 points or bands.

Embodiment 27: The method or system of any preceding embodiment, wherein the low-resolution spectral data has no more than 14 points or bands.

Embodiment 28: The method or system of any preceding embodiment, wherein the low-resolution spectral data has no more than 12 points or bands.

Embodiment 29: The method of any preceding embodiment, wherein the high-resolution spectral data is based in part on interpolation between the colors of a preexisting palette.

Embodiment 30: A software application including computer-implemented code to provide data to a tinter for custom-tinting paint to match the color of a sensed surface, the code directing: transmission of high-resolution spectral data, optionally user information, optionally order information and optionally location information for a sensed surface, to a tinter for tinting a base paint or coating according to a custom-tint formula; wherein the high-resolution spectral curve data is derived from wideband spectral data of the sensed surface; and wherein the custom-tint formula includes amounts of one or more colorants from an array of colorants to be added to a base coating composition to generate a custom-tinted coating composition; and wherein the amounts of one or more colorants is not pre-determined.

Embodiment 31: The software application of Embodiment 30, wherein transmission of the high-resolution spectral data uses a barcode.

Embodiment 32: The software application of Embodiment 31, wherein the barcode is a QR code.

Embodiment 33: The software application of any one of Embodiments 30 to 32, wherein the code directs transmission of location information Embodiment 34: The software application of Embodiment 33, wherein the location information includes a GPS location.

Embodiment 34: The software application of Embodiment 33 or 34, wherein the location information includes a GPS location.

Embodiment 35: The software application of any preceding Embodiment, wherein the code directs display of location information of the sensed surface on a mobile device.

Embodiment 36: The software application of Embodiment 35, wherein the location information includes a GPS location.

Embodiment 37: The software application of any preceding Embodiment, wherein code directs transmission of user information or order information.

Embodiment 38: The software application of Embodiment 37, where the user information includes a description or identification of the sensed surface.

Embodiment 39: The software application of any one of Embodiments 37 or 38, where the user information includes an identification of a user, an account number, a user's address, or combinations thereof.

Embodiment 40: The software application of any one of Embodiments 37 to 39, wherein the order information includes a requested base coating composition, sheen, or requested volumes.

Embodiment 41: The software application of any one of Embodiments 37 to 40, wherein the user information includes user notes of the sensed surface.

Embodiment 42: The software application of any preceding Embodiment, wherein the code further directs display of user information or order information on a mobile device.

Embodiment 43: The software application of Embodiment 42, wherein the user information includes a description or identification of the sensed surface.

Embodiment 44: The software application of any one of Embodiments 42 or 43, wherein the user information includes an identification of a user, an account number, a user's address, or combinations thereof.

Embodiment 45: The software application of any one of Embodiments 42-44, wherein the order information includes a requested base coating composition, sheen, or requested volumes.

Embodiment 46: The software application of any one of Embodiments 42-45, wherein the user information includes user notes of the sensed surface.

Embodiment 47: The software application of any preceding Embodiment, wherein the code further directs displaying a depiction of the color of the sensed surface on a mobile device screen.

Embodiment 48: The software application of any preceding Embodiment, wherein the code further directs displaying a color in a pre-existing library of palette colors that is a closest match to the color of the sensed surface.

Embodiment 49: The software application of Embodiment 48, wherein the code causes a user to determine whether the closest match to the color of the sensed surface is acceptable.

Embodiment 50: The software application of any preceding Embodiment, wherein the high resolution spectral curve data has 16 points or 31 points.

Embodiment 51: The software application of any preceding Embodiment, wherein the high resolution spectral curve data ranges from about 450 nm to about 650 nm.

Embodiment 52: The software application of any preceding Embodiment, wherein the high resolution spectral curve data is derived from interpolating more than one low resolution spectral data.

Embodiment 53: The software application of any preceding Embodiment, wherein the high resolution spectral curve data accounts for surface texture of the sensed surface.

Embodiment 54: The software application of any preceding Embodiment, wherein the base coating composition is a paint and the custom-tinted coating composition is a tinted paint.

Embodiment 55: A method for providing data to a tinter for custom-tinting paint to match the color of a sensed surface, comprising: transmitting high-resolution spectral data, optionally user information, optionally order information, and optionally location information for a sensed surface, to a tinter for tinting a base paint or coating according to a custom-tint formula; wherein the high-resolution spectral curve data is derived from wideband spectral data of the sensed surface; and wherein the custom-tint formula includes amounts of one or more colorants from an array of colorants to be added to a base coating composition to generate a custom-tinted coating composition; and wherein the amounts of one or more colorants is not pre-determined.

Embodiment 56: The method of Embodiment 55, wherein the high-resolution spectral data is transmitted using a barcode.

Embodiment 57: The method of Embodiment 55, wherein the barcode is a QR code.

Embodiment 58: The method of Embodiment 55, wherein the location information is transmitted.

Embodiment 59: The method of any preceding Embodiment, further comprising: directing display of location information of the sensed surface on a mobile device.

Embodiment 60: The method of Embodiment 59, wherein the location information includes a GPS location.

Embodiment 61: The method of any preceding Embodiment, where the user information or order information is transmitted.

Embodiment 62: The method of Embodiment 61, wherein the user information includes a description or identification of the sensed surface.

Embodiment 63: The method of any one of Embodiments 60 or 61, wherein the user information includes an identification of a user, an account number, or a user's address, or combinations thereof.

Embodiment 64: The method of any one of Embodiments 60-62, wherein the order information includes one or more requested base coating compositions or sheens and volume information.

Embodiment 65: The method of any one of Embodiments 60 to 63, wherein the user information includes user notes of the sensed surface.

Embodiment 66: The method of any preceding Embodiment further comprising: displaying a depiction of the sensed color on a mobile device screen.

Embodiment 67: The method of any preceding Embodiment further comprising: displaying a color in a pre-existing library of palette colors that is a closest match to the sensed color.

Embodiment 68: The method of any one of Embodiment 66 or 67 further comprising: causing a user to determine whether the closest match to the color of the sensed surface is acceptable.

Embodiment 69: The method of any preceding Embodiment, wherein the high resolution spectral curve data has 16 points or 31 points.

Embodiment 70: The method of any preceding Embodiment, wherein the high resolution spectral curve data ranges from about 450 nm to about 650 nm.

Embodiment 71: The method of any preceding Embodiment, wherein the high resolution spectral curve data is derived from interpolating more than one low resolution spectral data.

Embodiment 72: The method of any preceding Embodiment, wherein the high resolution spectral curve data accounts for surface texture of the sensed surface Embodiment 73: The method of any preceding Embodiment, wherein the base coating composition is a paint and the custom-tinted coating composition is a tinted paint.

What is claimed is:

1. A software application including computer-implemented code to provide data to a tinter for custom-tinting paint to match the color of a sensed surface, the code directing:

transmission of high-resolution spectral data and order information including one or more requested base coating compositions or sheens and requested volumes for tinting a base paint or coating according to a custom-tint formula;

wherein the high-resolution spectral curve data is derived from wideband spectral data of the sensed surface; and wherein the custom-tint formula includes amounts of one or more colorants from an array of colorants to be added to a base coating composition to generate a custom-tinted coating composition; and wherein the amounts of one or more colorants is not pre-determined.

2. The software application of claim 1, wherein transmission of the high-resolution spectral data uses a barcode.

3. The software application of claim 2, wherein the barcode is a QR code.

4. The software application of claim 1, wherein the code further directs display of location information of the sensed surface on a mobile device.

5. The software application of claim 1, wherein the location information includes a GPS location.

6. The software application of claim 1, wherein the code further directs transmission of user information.

7. The software application of claim 6, wherein the code further directs display of user information or order information on a mobile device.

8. The software application of claim 6, wherein the user information includes an identification of a user, an account number, a user's address, or combinations thereof.

9. The software application of claim 1, wherein the code further directs displaying a depiction of the color of the sensed surface on a mobile device screen.

10. The software application of claim 1 further comprising:

wherein the code further directs displaying a color in a pre-existing library of palette colors that is a closest match to the color of the sensed surface.

11. The software application of claim 1, wherein the high resolution spectral curve data has 16 points or 31 points.

12. The software application of claim 1, wherein the high resolution spectral curve data ranges from about 450 nm to about 650 nm.

13. The software application of claim 1, wherein the high resolution spectral curve data is derived from interpolating more than one low resolution spectral data.

14. The software application of claim 1, wherein the high resolution spectral curve data accounts for surface texture of the sensed surface.

15. The software application of claim 1, wherein the base coating composition is a paint and the custom-tinted coating composition is a tinted paint.

* * * * *